July 9, 1957  R. J. ANDERSON  2,798,267
PALLET-HANDLING DEVICE FOR HANDLING FOUNDRY MOLDS
Filed Aug. 2, 1955  8 Sheets-Sheet 1

Inventor
Russell J. Anderson
by Edward O. Vogl
Attorney

July 9, 1957

R. J. ANDERSON 2,798,267

PALLET-HANDLING DEVICE FOR HANDLING FOUNDRY MOLDS

Filed Aug. 2, 1955

Inventor
Russell J. Anderson
By /Attorney

July 9, 1957 R. J. ANDERSON 2,798,267
PALLET-HANDLING DEVICE FOR HANDLING FOUNDRY MOLDS
Filed Aug. 2, 1955. 8 Sheets-Sheet 5

July 9, 1957 R. J. ANDERSON 2,798,267
PALLET-HANDLING DEVICE FOR HANDLING FOUNDRY MOLDS
Filed Aug. 2, 1955 8 Sheets-Sheet 8

Inventor
Russell J. Anderson
by Hilmond O. Vogel
Attorney

United States Patent Office 2,798,267
Patented July 9, 1957

2,798,267

PALLET-HANDLING DEVICE FOR HANDLING FOUNDRY MOLDS

Russell J. Anderson, Racine, Wis., assignor to Belle City Malleable Iron Company, a corporation of Wisconsin Application August 2, 1955, Serial No. 526,023

31 Claims. (Cl. 22—20)

This invention relates to a mold-handling and conveying device. More particularly, it relates to a device for handling and conveying molds from a molding machine to a casting station.

In general, the basic steps in the foundry process of casting include: the making of the mold by a suitable molding machine, the confinement of the mold in a suitable jacket during the pouring of casting metal, the actual pouring, and the subsequent dumping of the mold to extricate the finished casting. The handling of the mold during these steps has long been a problem in foundries, since the handling has largely been on a manual basis requiring numerous foundry helpers who would move the molds from place to place on a manual basis requiring considerable time and effort. With the advent of automatic handling equipment in many industries, has come the necessity of providing suitable handling equipment in the carrying out of foundry techniques, so as to improve production with a relatively more inexpensive handling method. In applicant's patents, No. 2,535,715, dated December 26, 1950, and No. 2,662,651, dated December 15, 1953, pallet-carrier and mold-dumping devices are disclosed which permit automatic dumping of the molds as they are conveyed from a casting station. In applicant's co-pending application, Serial No. 522,294, filed July 15, 1955, an automatic jacket-shifting device is disclosed; this device being operable to automatically move molds on pallet carriers from a position on a conveyor to a pouring station, whereupon jackets are automatically placed over the molds for pouring and are thereupon stripped from the molds when the casting process has been completed. It is a principal object of this invention to provide an improved means for conveying finished molds from a molding machine to a jacket-shifting and pouring station on a plurality of pallet carriers, and for returning the empty carriers, as needed, to the molding machine where they are placed in ready access to an operator who, in turn, can expeditiously fill the carriers with the finished product of the molding machine.

It is another object of this invention to provide an improved device for conveying a mold, as it leaves the molding machine, to a position adjacent an elevating mechanism arranged to discharge a loaded mold carrier, or pallet, and to place an empty carrier in position for loading by an operator.

A still further object is to provide an improved elevating device for handling empty pallets as they enter into a molding station; the device being arranged to raise the pallets into position for loading, and including means for retracting a loaded pallet into position for subsequent movement on a conveyor to a casting station.

A still other object of this invention is to provide an improved handling device for handling molds as they are made in a molder's station; the device including an elevating mechanism for placing empty mold carriers in position for loading, and including transfer means whereby loaded carriers may be directed to a plurality of adjacent conveyors, and empty pallets returned on said conveyors may be returned to said molder's station by said transfer means.

Another object is to provide an improved elevating device for elevating empty mold carriers in position for reloading; the device including a cradle which is engageable by said elevating device during one position to transfer empty carriers from a return track of a conveyor.

These and further objects of the invention will become more readily apparent from a reading of the specification when examined in connection with the accompanying drawings, in which:

Figure 7 is a side-elevational view showing an elevating device and a transfer-car mechanism with a carrier positioned thereon for transportation;

Referring now to the drawings, a pallet-handling device for handling foundry molds is generally referred to by the reference character 10. The device 10 comprises, essentially, a primary conveyor 11, a secondary conveyor 12, a transfer-car mechanism 13, an elevating mechanism 14, and a mold-transfer mechanism 15.

The conveyors

Figure 1:
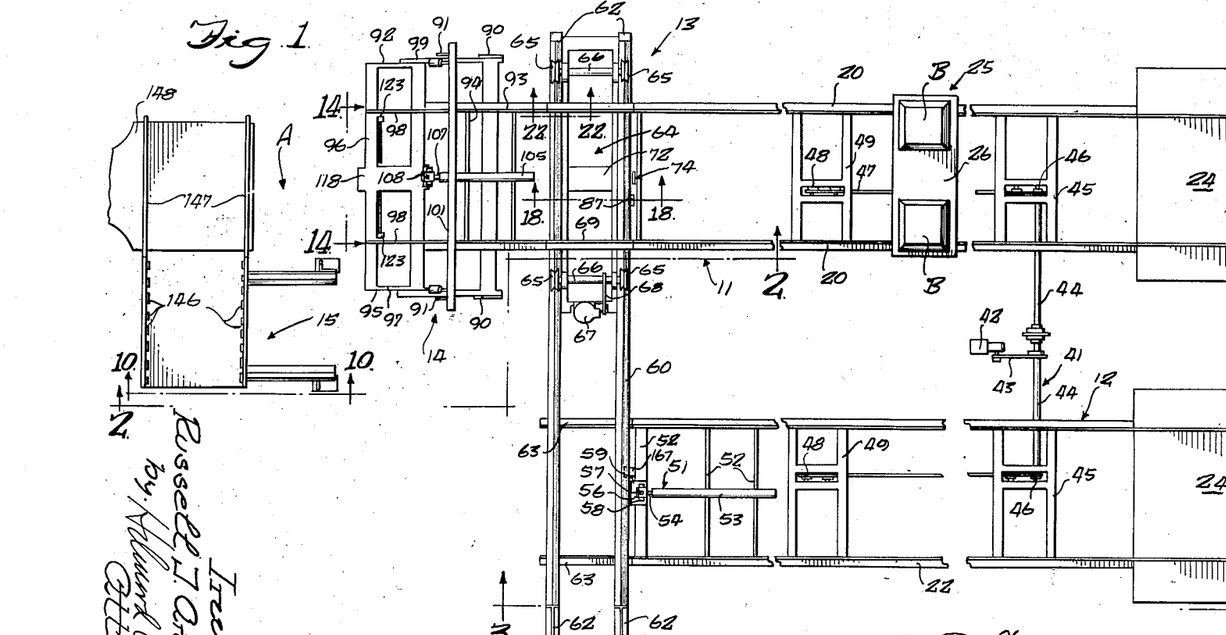
Figure 1 is a plan view of a pallet-handling device, or arrangement, for handling foundry molds.
Figure 8:
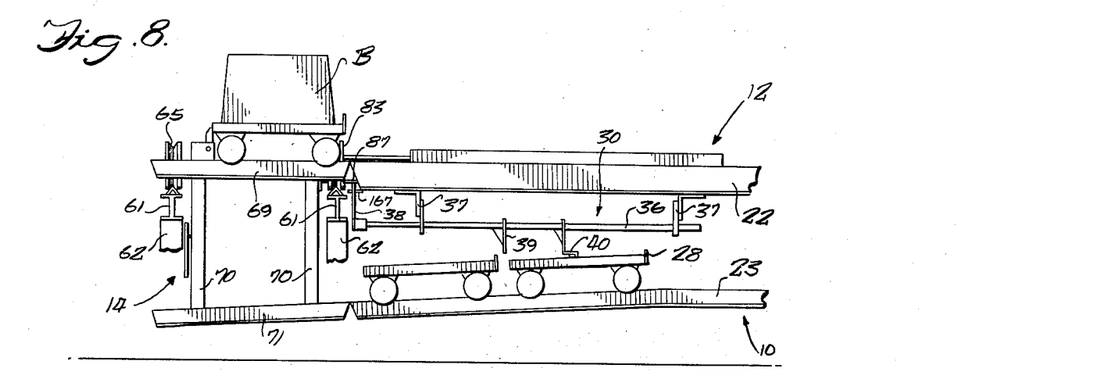
Figure 8 is a side-elevational view of a secondary conveyor line, similar to Figure 3, showing a carrier in position for discharge from a transfer car.
Figure 9:
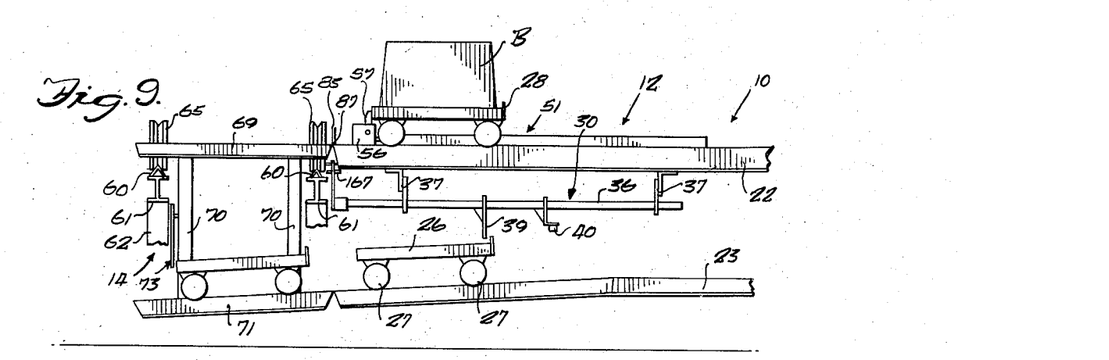
Figure 9 is a view similar to Figure 8, showing another stage in the operation.
Figure 10:
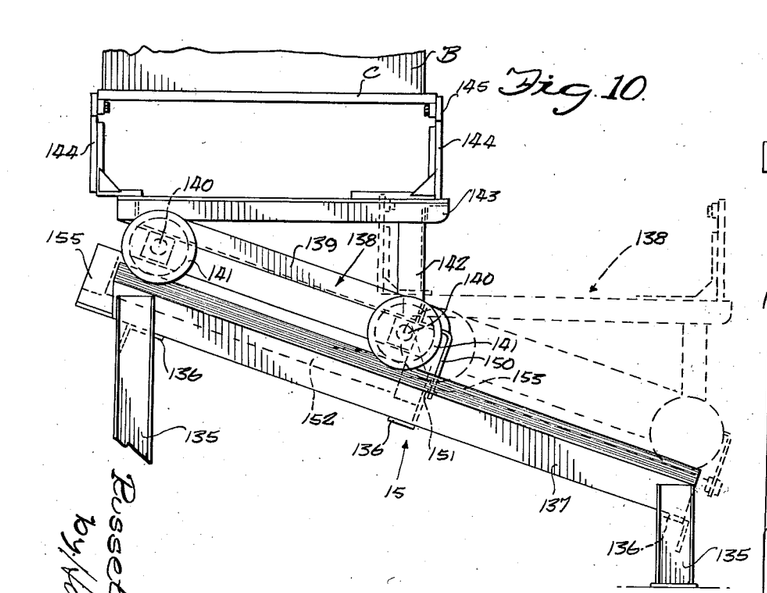
Figure 10 is a side-elevational view of a mold-transfer device positioned adjacent a mold machine, the view being taken substantially along the line 10—10 of Figure 1.

The primary conveyor 11 comprises a pair of upper tracks 20 and lower tracks 21. The secondary conveyor 12 comprises upper tracks 22 and lower tracks 23. As shown in Figure 1, the tracks 20 and 22 may be provided at one end with a dumping platform 24, suitable for receiving molds which have been poured at a casting station which can be located anywhere intermediate the ends of the conveyor. A plurality of mold carriers, or pallets, 25 may be movably supported on the tracks. The upper track may be sloped toward the dumping platforms, and the lower tracks are generally sloped toward the elevating mechanism 14. Each carrier 25 includes a supporting platform 26 positioned on wheels 27. A raised lip 28 on each carrier serves as an engaging means for a stop and release mechanism, which in the conveyor 11 is designated at 29 and in the conveyor 12 is designated at 30, as best shown in Figures 8, 9, and 10.

The stop and release mechanism 29 comprises a bracket structure 31 on which an extensible device 32 is mounted. The extensible device includes a piston rod 33 which is pivotally connected to an arm 34 of a hook member 35. The hook member 35 is pivotally mounted on the structure 31.

Figure 21:
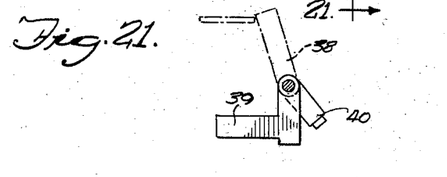
Figure 21 is a cross-sectional view taken along the line 21—21 of Figure 20.

The stop and release mechanism 30 for the secondary conveyor comprises a rod 36 which is pivotally mounted in bearing hangers 37 fastened to the underneath side of the track 22. The rod 36 has an arm 38 at one end and stops 39 and 40 are connected to the rod 36. The stops 39 and 40, as shown in Figure 21, are angularly disposed relative to each other.

Figure 3:
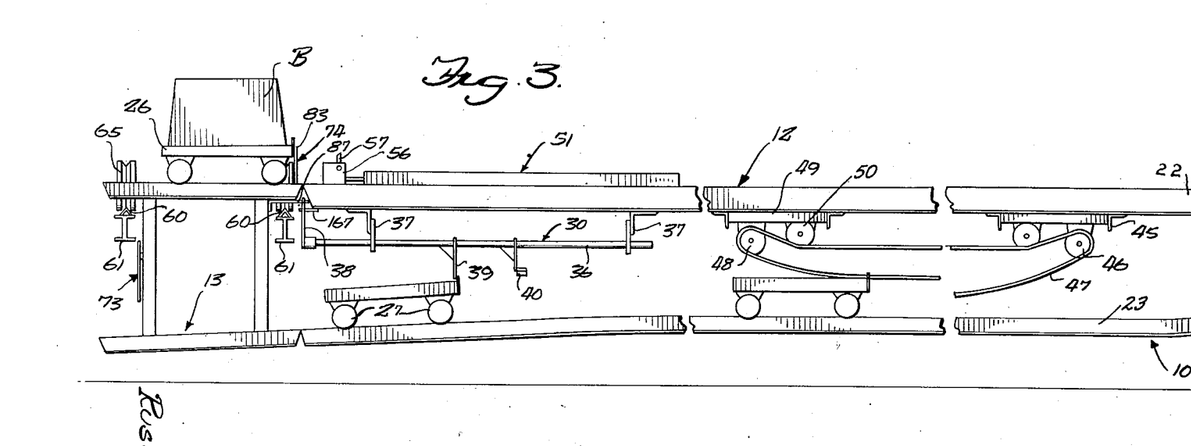
Figure 3 is an elevational view taken substantially along the line 3—3 of Figure 1.

A drag mechanism, as best shown in Figures 1 and 3, is designated by the reference character 41. The drag mechanism comprises a motor 42 which, by means of a belt drive 43, rotates shafts 44 which are rotatably supported on supports 45. The shafts 44 have connected thereto pulleys 46 which engage in driving relation a drag chain, or belt of the endless type, 47 disposed centrally on each of the conveyors 11 and 12. A pulley 48, likewise, is mounted on supports 49 and the drag chains 47 are trained about said pulleys 48. Idler pulleys 50 also are suitably supported on the supports 45 and 49. The drag chains 47 may be made of rubber or similar resilient material; and as the empty carriers 26 are situated on the lower tracks, they will be engaged by the drag chains, or belts, 47 along their upper surfaces and moved under power to the end of the conveyor line nearest the elevating mechanism. This assures a positive action which is not present if the slope alone, of the lower tracks, is relied upon.

The secondary conveyor also comprises an ejecting mechanism 51 which is positioned on transverse bars 52 supported on the upper tracks 22. The ejecting mechanism includes a fluid cylinder 53 having a piston arm 54 which is connected to an ejector head 56 having a one-way dog 57. The ejector head 56 also includes rollers 58 which are adapted to roll on a plate 59 during actuation.

The transfer-car mechanism

The transfer-car mechanism 13 comprises, as best shown in Figures 1, 8, and 9, a track 60 extending transversely of and below the upper tracks 20 and 22. The track 60 is supported on transverse beams 61 supported at their ends on uprights 62. The track 60 is also connected by transverse members 63. A transfer car 64 comprises wheels 65 which roll on the track 60. Shafts 66 are carried on the car to support said wheels 65; one of said shafts 66 being driven by a reversible motor 67 by means of a belt drive 68. The car 64 also includes an upper track section 69 adapted to register with the tracks 20 and 22. Vertically extending supports 70 are suspended from the car 64; the said supports 70 carrying a lower track section 71 adapted to register with the lower tracks 21 and 23. As best shown in Figure 1, the transfer car also includes a transversely extending flat plate 72 which is adapted to register with the plate 59 when the car 64 is in position adjacent the secondary conveyor.

Figures 2, 22, 23:
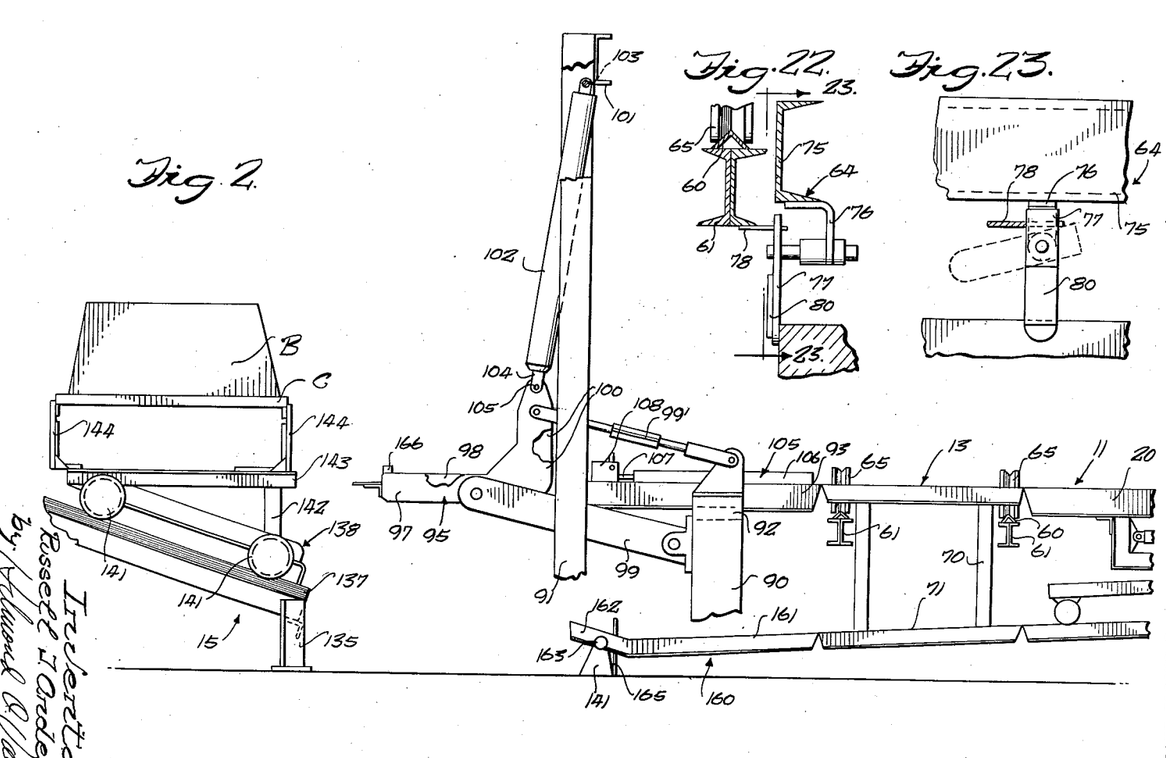
Figure 2 is an elevational view, partly in section, taken substantially along the line 2—2 of Figure 1.
Figure 22 is an enlarged cross-sectional view showing a carrier-stop and release mechanism on a transfer car, the view being taken along the line 22—22 of Figure 1.
Figure 23 is a cross-sectional view taken along the line 23—23 of Figure 22.

The transfer car 64 is provided with several carrier-stop and release mechanisms, designated at 73 and 74. The release mechanism 73 is best shown in Figures 22 and 23. A channel portion 75 of the car 64 has a bracket 76 connected thereto. A stop 77 is pivotally mounted on the bracket 76; the stop having a counterweight 80 which normally tends to maintain the stop 77 in an upright stop position. An actuator bracket 78 is positioned on one of the beams 61; the said arm 78 engaging the stop 77 when the car reaches the position shown in Figure 1, thereby moving the stop to a disengaged position.

Figure 18:
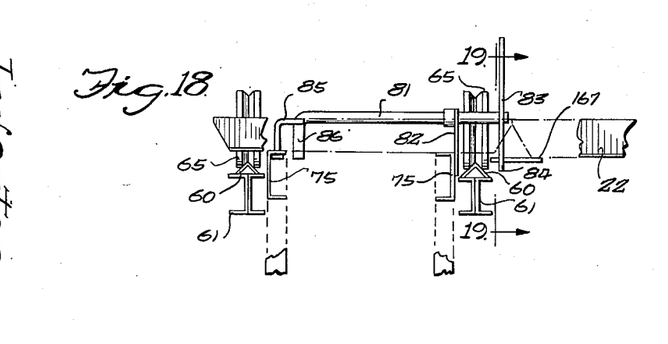
Figure 18 is a detail sectional view of a carrier-stop and release mechanism taken along the line 18—18 of Figure 1.
Figure 19:
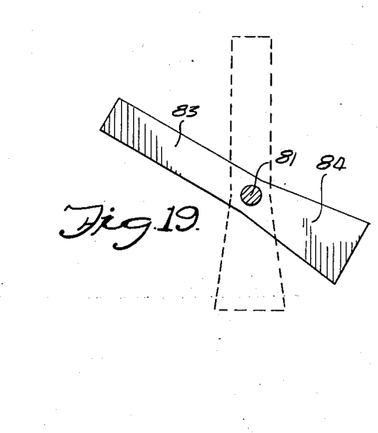
Figure 19 is a cross-sectional view taken along the line 19—19 of Figure 18.
Figure 20:
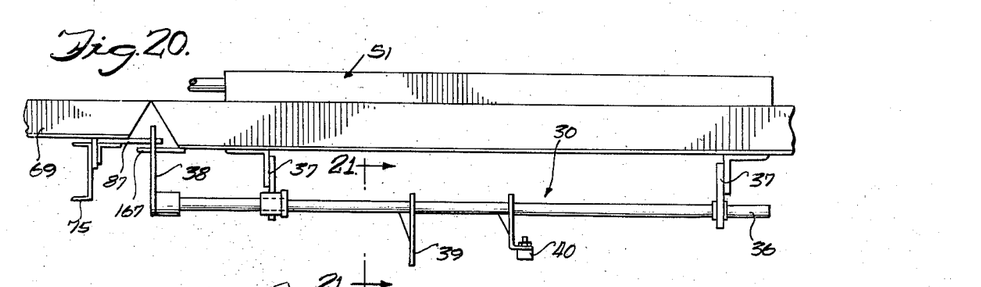
Figure 20 is an enlarged detail view, in elevation, of a carrier-stop and release mechanism of a secondary conveyor line.

The carrier-stop and release mechanism 74 comprises, as best shown in Figures 18 and 19, an L-shaped rod 81 which is pivoted on a bracket 82 mounted on one of the members 75. The rod 81 has a stop 83 connected thereto. The stop 83 is provided at its lower end with a weight 84 normally tending to maintain the stop 83 in an upright position. The stop 83 may be held in an out-of-the-way position by means of a catch 85 mounted on one of the beams 75; the catch being adapted to engage an L-shaped end 86 to hold the same in a horizontal position whereby the stop 83 is moved from the position shown in Figure 18.

As best shown in Figures 1, 8, 9, and 20, the car 64 is also provided with a plate member 87 which is adapted to engage and move the arm 38 when the car 64 is in registry with the secondary conveyor.

The elevating mechanism

The elevating mechanism 14 is well disclosed in Figures 1, 2, 4, 7, and 12. It comprises upright supports 90 and 91. A laterally extending support 92 connects the supports 90, and a track section 93 is positioned on the support 92. The tracks of the section 93 are also connected together by lateral members 94. An elevating table is designated at 95. The table 95 comprises laterally extending members 96 and end members 97. Track sections 98 are positioned on the table 95; these track sections, as shown in Figure 1, being adapted to register with the track section 93. The table 95 is movable on parallel links 99 and 99' which are pivotally connected to the table 95 and to the supports 90. The link 99' is connected to vertical arms 100 mounted on the table. A channel member 101 is supported on the supports 91, and a pair of cylinders 102 are pivotally connected to the member 101, as indicated at 103. A piston ram arm 104 is connected to each arm 100 to move said table vertically on the parallel arms 99 and 99'.

An ejector mechanism is designated at 105. This mechanism is quite similar to the one designated generally at 51, and comprises a cylinder 106 supported on the members 94. The cylinder 106 includes a piston arm 107 to which an ejector head 108 is connected.

Figure 14:
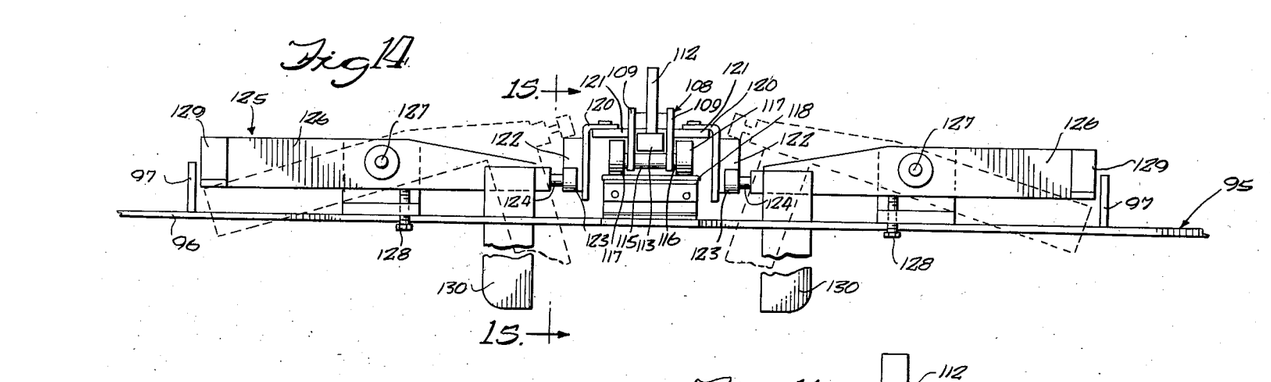
Figure 14 is an enlarged front view of an elevating table and carrier-stop mechanism taken along the line 14—14 of Figure 1.
Figures 15, 16, 17:
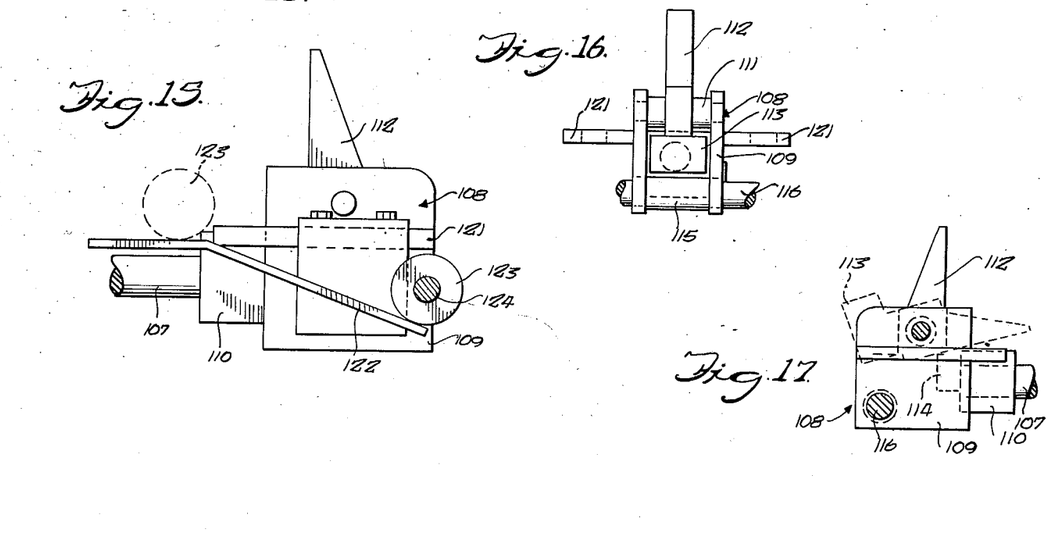
Figure 15 is an enlarged detail sectional view taken along the line 15—15 of Figure 14.
Figure 16 is a front-elevational detail view of an ejection head of an ejector mechanism.
Figure 17 is a side-elevational view of the head shown in Figure 16.

The ejector head 108 is best shown in Figures 14 through 16. It comprises spaced plate members 109 connected by means of a block 110 to which the rod 107 is connected. A sleeve 111 rotatably supports a hook 112 having a counterweight 113. In the upright position to which the counterweight 113 normally brings the hook 112, the counterweight 113 is up against a block 114 which is connected to the block 110. Thus, when the ram, or rod, 107 is moved to the right, the hook 112 is maintained in the vertical position against the block 114. However, when it is moved to the left, it is pivoted when it engages one of the carriers, by virtue of its pivotal movement, until it moves beyond the carrier for hooking the same. The plates 109 also support a sleeve 115 having a shaft 116 connected thereto. Rollers 117 are connected to the shaft 116, and these are free to roll on a plate 118 centrally disposed on the table 95, as shown in Figures 1 and 14. The parts of the ejector mechanism thus described, are identical to the mechanism 51, and other elements thereof described, and operate in the same manner.

The head 108 also includes brackets 120 suitably connected to plates 121 on the head. The brackets 120 include sloping tracks 122 which are adapted to engage rollers 123 pivoted on shafts 124 of a pallet-release mechanism, generally designated at 125, as best shown in Figure 14. The mechanism 125 comprises arms 126 pivotally mounted on the front transverse member 96, as indicated at 127. Adjustable screws 128 are provided to level said arms 126. The arms 126, at their outer ends, comprise wheel-engaging members, or chocks, 129; and at their other ends support the shafts 124. Floor-engaging members 130 are also connected to the arms 126.

The mold-transfer mechanism

Figure 11:
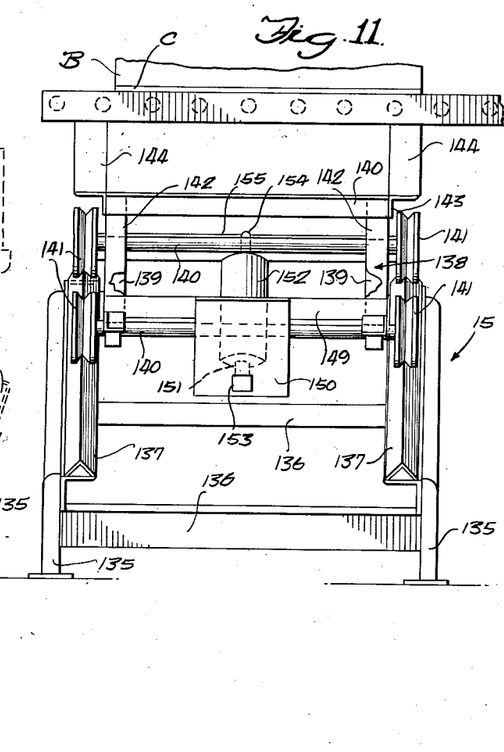
Figure 11 is a front view of the device, in elevation, shown in Figure 10.
Figure 13:
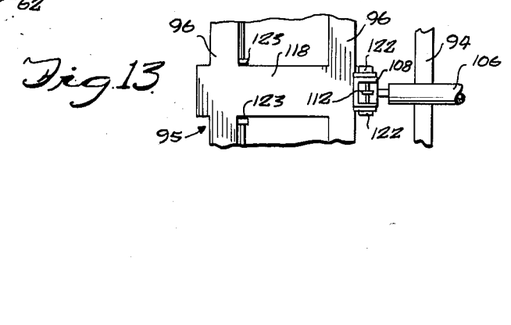
Figure 13 is an enlarged detail view of an ejectment mechanism of a primary line or conveyor.

Referring now to Figures 1, 10, and 11, the transfer mechanism 15 comprises upright supports 135 connected by transverse members 136. Laterally spaced track members 137 are mounted on the supports 135; the said track members being inclined. A wheeled carriage 138 comprises side members 139 having shafts 140 carried thereon; track wheels 141 are suitably supported on the track 137. Upright members 142 are connected to the side members 139; the upright members 142 supporting a rectangular structure 143 having uprights 144 connected thereto. The uprights 144 support horizontal members 145 which are provided with a plurality of rollers 146. As best shown in Figure 1, the rollers 146 are adapted to be placed in alignment with the tracks 147 of a molding machine 148 positioned at a molder's station A. The molding machine 148 forms no part of this invention, and will not be further described. The carriage 138 is provided at its front end with a transverse member 149 supporting a bracket 150. The piston rod 151, of a cylinder 152, is connected to the bracket, as indicated at 153. The cylinder 152 is connected, as indicated at 154, to a cross beam 155 suitably carried on the supports 135. By virtue of fluid pressure in the cylinder 152, the carriage 138 may be pushed down the tracks 137, to the position shown in dotted lines in Figure 10, and may be returned to its original position.

As best shown in Figures 4, 5, 6, 7, and 12, a cradle 160 is positioned immediately below the track section 93. The cradle 160 comprises spaced tracks 161 extending upwardly for registry with the track 71 of the transfer car. Short tracks 162, sloping upwardly, also are connected to the tracks 161. The cradle is pivoted on a shaft 163 supported on spaced supports 141. A block 164 limits the lower position of the track 161. A stop 165 is seated on the floor, and normally projects above the track 161.

The operation

Figure 4:
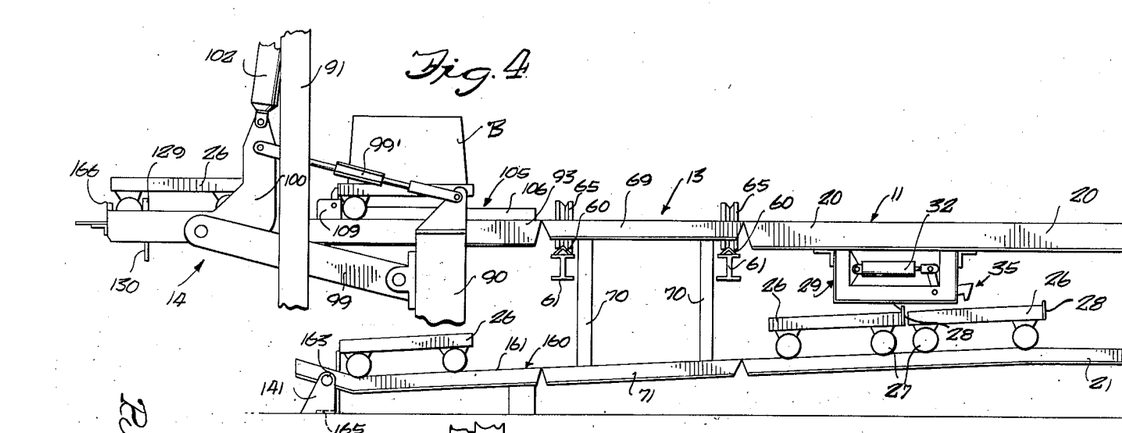
Figure 4 is a side-elevational view of a primary line showing an elevating device having a mold carrier thereon in the process of ejecting the same to a conveyor track.

Assuming that an empty carrier 26 appears on the table in front of the molder's station A, the said carrier is ready for loading, as shown in Figure 4. The molding machine 148 at station A blows a conventional sand mold B which travels on a board C on tracks 147 to the rollers 146 of the carriage 138. The carriage 138 now is moved to its lower position, shown in dotted lines in Figure 10 and in full lines in Figure 2. The molder now removes the mold and loads the same on the carrier which is positioned on the table. The carriage 138 then returns to its original position, another mold is made, and the loading operation is repeated.

The carrier is now full. It may be seen from Figs. 12 and 14 that the arms 126 are in the horizontal position. This means that the wheel-engaging members 129 are placed in the rear of the front wheels of the pallet carrier, so that it is retained on said table against movement to the right.

Figures 5, 6, 12:
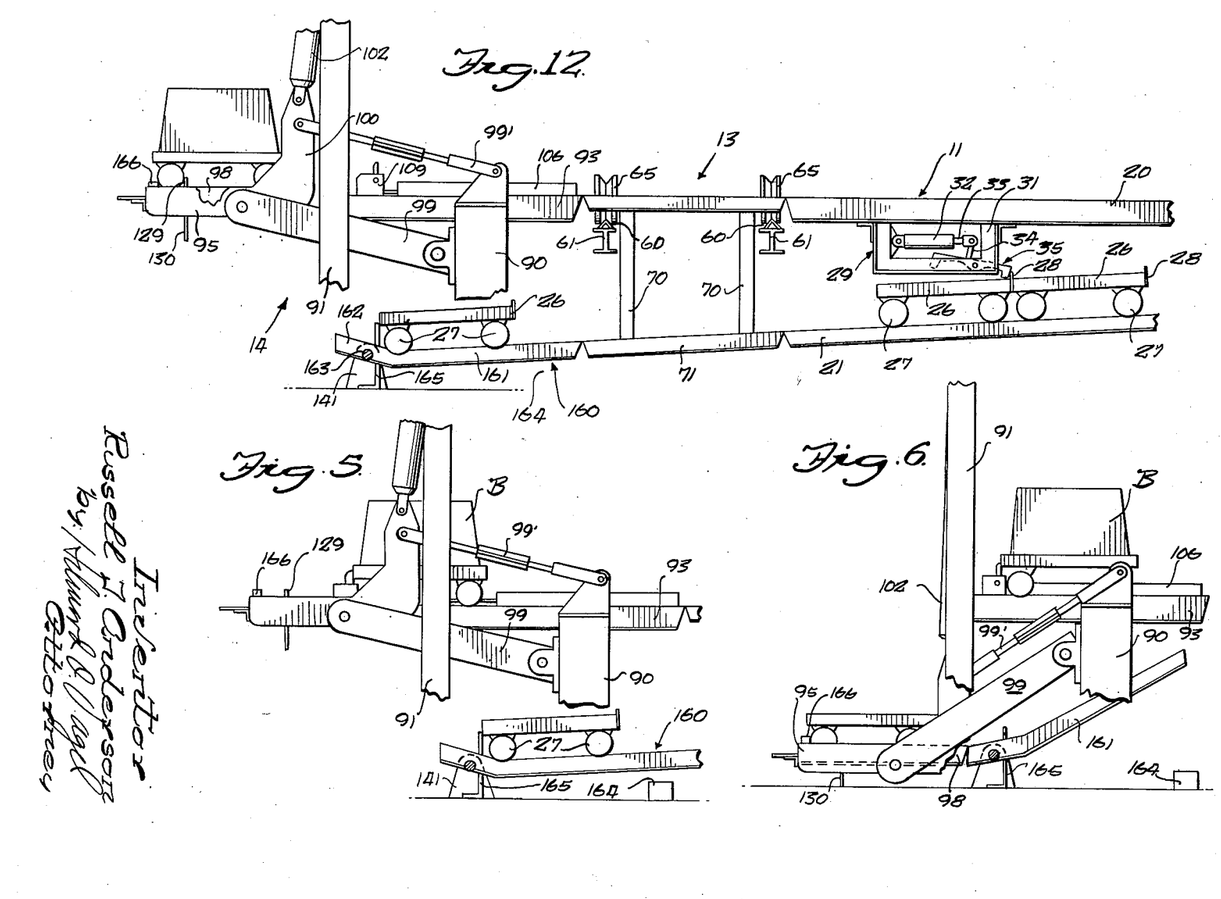
Figure 5 is a side-elevational view showing an elevating device and an ejectment mechanism in operation.
Figure 6 is a side-elevational view of an elevating mechanism in a lowered position.
Figure 12 is a side-elevational view of a primary mold conveyor and elevating device, similar to Figure 4, showing the operation of a carrier-release mechanism.

The ejector mechanism 105 is now actuated, and the head 108 moves underneath the loaded carrier. As it thus moves, the hook 112 is free to pivot in clockwise manner so that the head 108 retracts the carrier, as shown in Figure 5; whereupon the carrier is moved to the track section 93. As subsequent carriers are thus moved into this position, previous carriers will be forced into the track section 69 and to the conveyor track 20. The ejector mechanism 105 thus not only moves the immediate carrier on the table, but serves to move the other carriers previously ejected.

During its movement toward the carrier on the table, the head 108 has the tracks 122 engage the rollers 123, whereby the arms are tilted to the dotted-line position shown in Figure 14. Thus the carrier on the table is free to be ejected by the mechanism 105, as afore-described.

As indicated in Figures 4 and 12, while the carrier is being loaded, an empty carrier has been released by the mechanism 29 to the cradle 160. The released carrier rolls on the cradle tracks 161, and is stopped in position by means of the stop 165. As the hook member 35 has its left-hand hook lifted to disengage from a lip 28 of a carrier, the right-hand hook engages the lip of another carrier to hold the same in position so that numerous carriers may be held in reserve. Not more than one carrier is released at any one time. Thus, in effect, as the left-hand hook is moved upwardly to release one carrier, the right-hand hook acts as a stop to hold the other carriers in position. Then, as the hook member 35 is pivoted again, the left-hand hook is lowered to again catch the lip of a carrier to hold the same until the next release. The mechanism 29 may be automatically actuated by suitable electrical mechanism in response to the positioning of the elevating mechanism table in relation to the cradle.

An empty carrier is now delivered to the cradle, as shown in Figures 4 and 12. As noted, the stop 165 limits the movement of the carrier on the cradle 160. The hydraulic cylinders 102 are now actuated by the operator to lower the table so that it is moved to the lower position shown in Figure 6; whereupon the rear end of the tracks 98 engage the track portions 162, thereby raising the tracks 161 upwardly. The carrier is now also raised upwardly above the stop 165, and the carrier is thus released to the track 98 of the table. As the carrier has moved to the track of the table, it is, of course, necessary to lock the same against movement. Referring to the mechanism shown in Figures 6 and 14, it is apparent that the floor-engaging members 130 are adapted to engage the floor when the table is lowered into its lowermost position. As the members 130 engage the floor and the table is lowered further, the arms 126 are pivoted to the dotted-line position shown in Figure 14; and thus the wheel chocks 129 are moved out of position to permit to carrier to move against a stop 166. As the table is then raised, the arms 126 are again swung to their horizontal position, and the chocks engage the rear wheels of the carrier to maintain the same on the table. The table is now moved upwardly again to the position indicated in Figure 4 and 12, whereupon loading of the molds takes place.

The primary conveyor is thus loaded with loaded mold carriers which are ejected from the elevating mechanism. When the molder sees that the primary conveyor has a sufficient number of loaded carriers thereon, he then decides to load the secondary conveyor.

The operator, or molder, now reaches underneath the transfer car 64 and turns the catch 85 to the position indicated in Figure 18, whereupon the stop 83 can pivot to a vertical position, as also shown in Figures 3, 8, and 9. Thus a barrier is set up on the transfer-car track 69 which will prevent a carrier moving to said track from continuing on to the track of the primary conveyor.

The power unit 67 is now set in operation and the transfer car moves into position, with respect to the secondary line, whereby the upper and lower track sections of the transfer car are in registry with the upper and lower tracks of the secondary conveyor. As the transfer car moves into position, the lower end of the stop 83, to which the weight 84 is connected, engages a member 167, shown in Figures 1, 3, 8, 9, 18, and 20. This member 167 is so positioned on a transverse bar 52 that the stop 83 is swung in a clockwise position, out of the way of the loaded carrier. In other words, it is no longer a barrier, and the carrier is free to be ejected to the secondary conveyor's upper track. The ejection mechanism 53 is now actuated, and the head 56 is moved to engage the carrier to pull the same toward the conveyor track. The rollers 58 slide on the plates 59 and 72 in this ejection movement.

Simultaneously, with the transfer car moving into position, the mechanism 30 is actuated. As shown in Figures 3, 8, 9, and 20, a plate member 87 moves against the arm 38 to tilt the rod 36 clockwise. This causes the stop 39 to be raised from the lip of a carrier, whereupon the carrier is free to roll down into the track section 71 of the transfer car. As the carrier moves into this position, it engages a stop 73, as best shown in Figure 9. When a carrier is thus released from the stop 39, the stop 40 is moved into position to catch the lip of another carrier moving down into position. Thus the mechanism 30 operates in similar manner to the mechanism 29.

The transfer car's upper track is now empty, and the lower track carries an empty carrier. The car now moves to its original position. As it returns to this position, the stop 77, as shown in Figures 22 and 23, engages the bracket 78 to tilt the stop 77 to an out-of-the-way position relative to the empty carrier on the lower track and the carrier can roll into the cradle 169. Now, as the table is again lowered, the cradle is tilted to discharge the carrier to the track of the table.

Thus a complete cycle of operation has been described. It is contemplated that the complete cycle can be electrically controlled so that upon the loading of the molds, the operator starts the handling device in operation. By suitable automatic switches, the movement of the device can be completely automatic, requiring little attention by the operator.

Thus it is believed that the objects of the invention have been fully achieved, and that an improved mold-handling device has been disclosed. It must, of course, be realized that changes and modifications may be made which do not depart from the spirit of the invention, nor the scope thereof as defined in the appended claims.

What is claimed is:

1. A mold-handling mechanism comprising: a loading station, first and second laterally spaced conveyors adjacent said station, each conveyor including an upper track and a lower track, the upper track being adapted to support loaded wheeled mold pallets in movement from said loading station, the lower track being adapted to support empty mold pallets in movement to said loading station, a track at said loading station extending transversely with respect to open ends of said upper and lower tracks, a transfer car positioned on said transverse track, said transfer car including an upper track section and a lower track section, said car being movable from the first conveyor to the second conveyor for alternately bringing said upper and lower track sections respectively into alignment with the upper and lower tracks of each conveyor, a cradle having a cradle track section normally positioned in alignment with the lower tracks of said first conveyor and track sections of said transfer car to provide continuations thereof, said cradle track having a portion thereof sloping toward said station and another portion sloping away from said station, means mounting said cradle for pivotal movement whereby said cradle track may be tilted upwardly from alignment with said lower track of the first conveyor, an elevating device at said loading station, said elevating device comprising laterally spaced supports, a table positioned between said supports, parallel linkage means connecting said table to said supports, fluid-extensible means connected to said table for alternately raising and lowering the same relative to said upper track of said first conveyor and the cradle track, first ejectment means on said station for engaging and moving a mold pallet from said table to said upper track of said transfer car, said table being movable to a lowered position to engage said cradle to tilt the same whereby an empty carrier located thereon is delivered to said table, means adapted to move said transfer car to said second conveyor, a second ejectment means at said second conveyor for engaging a loaded pallet on said transfer car to move the same to said upper track of said second conveyor, said transfer car's lower track section being adapted to receive an empty pallet from said lower track of the second conveyor, and release means adapted to release said empty pallet to said cradle upon return of said transfer car to said first conveyor.

2. A mold-handling mechanism comprising: a loading station, first and second laterally spaced conveyors adjacent said station, each conveyor including an upper track and a lower track, the upper track being adapted to support loaded wheeled mold pallets in movement from said loading station, the lower track being adapted to support empty mold pallets in movement to said loading station, a track at said loading station extending transversely with respect to open ends of said upper and lower tracks, a transfer car positioned on said transverse track, said transfer car including an upper track section and a lower track section, said car being movable from the first conveyor to the second conveyor for alternately bringing said upper and lower track sections respectively into alignment with the upper and lower tracks of each conveyor, a cradle having a cradle track section normally positioned in alignment with the lower tracks of said first conveyor and track sections of said transfer car to provide continuations thereof, means mounting said cradle for pivotal movement whereby said cradle track may be tilted upwardly from alignment with said lower track of the first conveyor, an elevating device at said loading station, said elevating device comprising laterally spaced supports, a table positioned between said supports, parallel linkage means connecting said table to said supports, fluid-extensible means connected to said table for alternately raising and lowering the same relative to said upper track of said first conveyor and the cradle track, first ejectment means on said station for engaging and moving a mold pallet from said table to said upper track of said transfer car, said table being movable to a lowered position to engage said cradle to tilt the same whereby an empty carrier located thereon is delivered to said table, means adapted to move said transfer car to said second conveyor, a second ejectment means at said second conveyor for engaging a loaded pallet on said transfer car to move the same to said upper track of said second conveyor, said transfer car's lower track section being adapted to receive an empty pallet from said lower track of the second conveyor, and release means adapted to release said empty pallet to said cradle upon return of said transfer car to said first conveyor.

3. A mold-handling mechanism comprising: a loading station, first and second laterally spaced conveyors adjacent said station, each conveyor including an upper track and a lower track, the upper track being adapted to support loaded wheeled mold pallets in movement from said loading station, the lower track being adapted to support empty mold pallets in movement to said loading station, a track at said loading station extending transversely with respect to open ends of said upper and lower tracks, a transfer car positioned on said transverse track, said transfer car including an upper track section and a lower track section, said car being movable from the first conveyor to the second conveyor for alternately bringing said upper and lower track sections respectively into alignment with the upper and lower tracks of each conveyor, a cradle having a cradle track section normally positioned in alignment with the lower tracks of said first conveyor and track sections of said transfer car to provide continuations thereof, means mounting said cradle for pivotal movement whereby said cradle track may be tilted upwardly from alignment with said lower track of the first conveyor, an elevating device at said loading station, said elevating device comprising a table and laterally spaced supports, parallel linkage means connecting said table to said supports, power means connected to said table for alternately raising and lowering the same relative to said upper track of said first conveyor and the cradle track, first ejectment means on said station for engaging and moving a mold pallet from said table to said upper track of said transfer car, said table being movable to a lowered position to engage said cradle to tilt the same whereby an empty carrier located thereon is delivered to said table, means adapted to move said transfer car to said second conveyor, a second ejectment means at said second conveyor for engaging a loaded pallet on said transfer car to move the same to said upper track of said second conveyor, said transfer car's lower track section being adapted to receive an empty pallet from said lower track of the second conveyor, and release means adapted to release said empty pallet to said cradle upon return of said transfer car to said first conveyor.

4. A mold-handling mechanism comprising: a loading station, first and second laterally spaced conveyors adjacent said station, each conveyor including an upper track and a lower track, the upper track being adapted to support loaded wheeled mold pallets in movement from said loading station, the lower track being adapted to support empty mold pallets in movement to said loading station, a track at said loading station extending transversely with respect to open ends of said upper and lower tracks, a transfer car positioned on said transverse track, said transfer car including an upper track section and a lower track section, said car being movable from the first conveyor to the second conveyor for alternately bringing said upper and lower track sections respectively into alignment with the upper and lower tracks of each conveyor, a cradle having a cradle track section normally positioned in alignment with the lower tracks of said first conveyor and track sections of said transfer car to provide continuations thereof, means mounting said cradle for movement whereby said cradle track may be tilted upwardly from alignment with said lower track of the first conveyor, an elevating device at said loading station, said elevating device comprising a table and laterally spaced supports, parallel linkage means connecting said table to said supports, power means connected to said table for alternately raising and lowering the same relative to said upper track of said first conveyor and the cradle track, said table being movable to a lowered position to engage said cradle to tilt the same whereby an empty carrier located thereon is delivered to said table, means adapted to move said transfer car to said second conveyor, said transfer car's lower track section being adapted to receive an empty pallet from said lower track of the second conveyor, and release means adapted to release said empty pallet to said cradle upon return of said transfer car to said first conveyor.

5. A mold-handling mechanism comprising: a loading station, first and second substantially parallel conveyors adjacent said loading station, each conveyor including an upper track and a lower track for respectively moving mold carriers from and to said loading station, a transversely extending track positioned adjacent open ends of said upper and lower tracks, a transfer car movable on said transverse track, said car having upper and lower stub tracks alternately movable into registry with said upper and lower tracks, elevating means at said loading station, said means including a table movable from a lowered to an upper position, a cradle positioned between said first conveyor and said elevating means, said cradle including a cradle track having one end adapted to be positioned in registry with the lower stub track in one position, means pivotally mounting said cradle whereby said cradle track may be tilted to another position whereby said cradle track is in registry with said table, power means for moving said table vertically whereby a loaded mold carrier may be moved from the table to said upper stub track, means for moving said transfer car to said second conveyor, means for moving a loaded mold carrier on said upper stub track to said upper track of the second conveyor, first release means on said lower track for releasing an empty carrier to said lower stub track, said transfer car being movable to said first conveyor, second release means on said car releasable on movement of said car to said first conveyor for releasing a carrier on the lower stub track to said cradle track, said table being movable to its lowered position, and means on said table engaging said cradle for tilting said track whereby a carrier is moved by gravity to said table.

6. A mold-handling mechanism comprising: a loading station, first and second substantially parallel conveyors adjacent said loading station, each conveyor including an upper track and a lower track for respectively moving mold carriers from and to said loading station, a transversely extending track positioned adjacent open ends of said upper and lower tracks, a transfer car movable on said transverse track, said car having upper and lower stub tracks alternately movable into registry with said upper and lower tracks, elevating means at said loading station, said means including a table movable from a lowered to an upper position, a cradle positioned between said first conveyor and said elevating means, said cradle including a cradle track having one end adapted to be positioned in registry with the lower stub track in one position, means pivotally mounting said cradle whereby said cradle track may be tilted to another position whereby said cradle track is in registry with said table, power means for moving said table vertically whereby a loaded mold carrier may be moved from the table to said upper stub track, means for moving said transfer car to said second conveyor, first release means on said lower track for releasing an empty carrier to said lower stub track, said transfer car being movable to said first conveyor, second release means on said car releasable on movement of said car to said first conveyor for releasing a carrier on the lower stub track to said cradle track, said table being movable to its lowered position, and means on said table engaging said cradle for tilting said track whereby a carrier is moved by gravity to said table.

7. A mold-handling mechanism comprising: a loading station, first and second substantially parallel conveyors adjacent said loading station, each conveyor including an upper track and a lower track for respectively moving mold carriers from and to said loading station, a transversely extending track positioned adjacent open ends of said upper and lower tracks, a transfer car movable on said transverse track, said car haviing upper and lower stub tracks alternately movable into registry with said upper and lower tracks, elevating means at said loading station, said means including a table movable from a lowered to an upper position, a cradle positioned between said first conveyor and said elevating means, said cradle including a cradle track having one end adapted to be positioned in registry with the lower stub track in one position, means pivotally mounting said cradle whereby said cradle track may be tilted to another position whereby said cradle track is in registry with said table, power means for moving said table vertically whereby a loaded mold carrier may be moved from the table to said upper stub track, means for moving said transfer car to said second conveyor, first release means on said lower track for releasing an empty carrier to said lower stub track, said transfer car being movable to said first conveyor, and second release means on said car releasable on movement of said car to said first conveyor for releasing a carrier on the lower stub track to said cradle track, said table being movable to its lowered position, whereby said cradle is movable to discharge a carrier to said table.

8. A mold-handling mechanism comprising: a loading station, first and second substantially parallel conveyors adjacent said loading station, each conveyor including an upper track and a lower track for respectively moving mold carriers from and to said loading station, a transversely extending track positioned adjacent open ends of said upper and lower tracks, a transfer car movable on said transverse track, said car having upper and lower stub tracks alternately movable into registry with said upper and lower tracks, elevating means at said loading station, said means including a table movable from a lowered to an upper position, a cradle positioned between said first conveyor and said elevating means, said cradle including a cradle track having one end adapted to be positioned in registry with the lower stub track in one position, means movably mounting said cradle whereby said cradle track may be tilted to another position whereby said cradle track is in registry with said table, said table being vertically movable whereby a loaded mold carrier may be moved from the table to said upper stub track, means for moving said transfer car to said second conveyor, first release means on said lower track for releasing an empty carrier to said lower stub track, said transfer car being movable to said first conveyor, and second release means on said car releasable on movement of said car to said first conveyor for releasing a carrier on the lower stub track to said cradle track, said table being movable to its lowered position, whereby said cradle is movable to discharge a carrier to said table.

9. A mold-handling mechanism comprising: first and second substantially adjacent parallel tracks adapted to movably support mold carriers, a loading station positioned at adjacent ends of said tracks, a transversely extending track at said station, a transfer car on said transverse track, said transfer car including a stub track adapted to be placed alternately in registry with either of said first and second tracks during movement of said transfer car, an elevating mechanism including a table having a track section adapted to register with said stub track and said first track during an elevated position of said table, support means adjacent said table, parallel linkage means connecting said table to said support means, power means connected to said table for raising said table from a lowered position to a raised position, an ejection mechanism on said elevating mechanism adapted to engage a filled carrier to move the same to said stub track, stop means on said transfer car to retain said carrier on said stub track, means on said transfer car to move the car and the stub track into registry with said second track, and means engageable with said stop means to release the same to permit movement of said carrier from said car to said second track.

10. A mold-handling mechanism comprising: first and second substantially adjacent parallel tracks adapted to movably support mold carriers, a loading station positioned at adjacent ends of said tracks, a transversely extending track at said station, a transfer car on said transverse track, said transfer car including a stub track adapted to be placed alternately in registry with either of said first and second tracks during movement of said transfer car, an elevating mechanism including a table having a track section adapted to register with said stub track and said first track during an elevated position of said table, power means connected to said table for raising said table from a lowered position to a raised position, an ejection mechanism on said elevating mechanism adapted to engage a filled carrier to move the same to said stub track, stop means on said transfer car to retain said carrier on said stub track, means on said transfer car to move the car and the stub track into registry with said second track, and means engageable with said stop means to release the same to permit movement of said carrier from said car to said second track.

11. A mold-handling mechanism comprising: first and second substantially adjacent parallel tracks adapted to movably support mold carriers, a loading station positioned at adjacent ends of said tracks, a transversely extending track at said station, a transfer car on said transverse track, said transfer car including a stub track adapted to be placed alternately in registry with either of said first and second tracks during movement of said transfer car, an elevating mechanism including a table having a track section adapted to register with said stub track and said first track during an elevated position of said table, support means adjacent said table, parallel linkage means connecting said table to said support means, power means connected to said table for raising said table from a lowered position to a raised position whereby a carrier may be moved to said stub track, stop means on said transfer car to retain said carrier on said stub track, means on said transfer car to move the car and the stub track into registry with said second track, and means engageable with said stop means to release the same to permit movement of said carrier from said car to said second track.

12. A mold-handling mechanism comprising: first and second substantially adjacent parallel tracks adapted to movably support mold carriers, a loading station positioned at adjacent ends of said tracks, a transversely extending track at said station, a transfer car on said transverse track, said transfer car including a stub track adapted to be placed alternately in registry with either of said first and second tracks during movement of said transfer car, an elevating mechanism including a table having a track section adapted to register with said stub track and said first track during an elevated position of said table, power means connected to said table for raising said table from a lowered position to a raised position whereby a carrier may be moved to said stub track, and means on said transfer car to move the car and the stub track into registry with said second track, to permit movement of said carrier from said car to said second track.

13. A mold-handling mechanism comprising: a loading station, first and second substantially parallel conveyors adjacent said loading station, said conveyors each including an upper and a lower track adapted to movably support mold carriers, a transversely extending track positioned at adjacent ends of said tracks, a transfer car positioned for movement on said transverse track, said transfer car having upper and lower stub tracks adapted to register with the tracks of the first conveyor during a first position, and with the tracks of the second conveyor during a second position, an elevating mechanism including a table alternately movable to a carrier-discharge position and to a carrier-receiving position, said transfer car during the first position being adapted to receive and discharge a carrier from said elevating table to the upper track of said first conveyor and to receive and discharge carriers from the lower track of the first conveyor to said table during its carrier-receiving position, said transfer car being movable to its second position for discharging a carrier to the upper track of said second conveyor, means for discharging an empty carrier to said lower stub track during the second position of said car, a movable stop on said transfer car engageable by said carrier, and means engaging said stop to release the same during the first position of said car whereby said empty carrier is released to said elevating table.

14. A mold-handling mechanism comprising: a loading station, first and second substantially parallel conveyors adjacent said loading station, said conveyors each including an upper and a lower track adapted to movably support mold carriers, a transversely extending track positioned at adjacent ends of said tracks, a transfer car positioned for movement on said transverse track, said transfer car having upper and lower stub tracks adapted to register with the tracks of the first conveyor during a first position, and with the tracks of the second conveyor during a second position, an elevating mechanism including a table alternately movable to a carrier-discharge position and to a carrier-receiving position, said transfer car during the first position being adapted to receive and discharge a carrier from said elevating table to the upper track of said first conveyor and to receive and discharge carriers from the lower track of the first conveyor to said table during its carrier-receiving position, said transfer car being movable to its second position for discharging a carrier to the upper track of said second conveyor, and means for discharging an empty carrier to said lower stub track during the second position of said car, said carrier being discharged from said transfer car to said elevating table during the return of said car to its first position.

15. A mold-handling mechanism comprising: a conveyor having lower and upper tracks adapted to movably support mold carriers, a loading station positioned adjacent ends of said tracks, a cradle in said loading station, said cradle including a cradle track, means adapted to provide for pivotal movement of said cradle track about a horizontal axis whereby said cradle track may be moved from a position in registry with said lower track to a raised position, a stop disposed adjacent said tracks to limit movement of a carrier received from said lower track, an elevating mechanism including a table, a track section on said table, power means connected to said table for moving the same from a lowered position, whereby the track section is in registry with said cradle track, to a raised position, whereby the track section is in registry with said upper track, an ejecting mechanism on said elevating mechanism comprising a fluid-extensible member adapted to move a loaded carrier from said track section during the raised position of said table to said upper track, and means on said table engaging said cradle during the lowered position of said table to tilt said track to a raised position whereby a carrier on said cradle track is moved away from said stop and said carrier is discharged to said track section.

16. A mold-handling mechanism comprising: a conveyor having lower and upper tracks adapted to movably support mold carrier, a loading station positioned adjacent ends of said tracks, a cradle in said loading station, said cradle including a cradle track, means adapted to provide for pivotal movement of said cradle track about a horizontal axis whereby said cradle track may be moved from a position in registry with said lower track to a raised position, a stop disposed adjacent said tracks to limit movement of a carrier received from said lower track, an elevating mechanism including a table, a track section on said table, power means connected to said table for moving the same from a lowered position, whereby the track section is in registry with said cradle track, to a raised position, whereby the track section is in registry with said upper track, means adapted to move a loaded carrier from said track section during the raised position of said table to said upper track, and means on said table adapted to tilt said track to a raised position whereby a carrier on said cradle track is moved away from said stop and said carrier is discharged to said track section.

17. A mold-handling mechanism comprising: a conveyor having lower and upper tracks adapted to movably support mold carriers, a loading station positioned adjacent ends of said tracks, a cradle in said loading station, said cradle including a cradle track, means adapted to provide for pivotal movement of said cradle track about a horizontal axis whereby said cradle track may be moved from a position in registry with said lower track to a raised position, an elevating mechanism including a table, a track section on said table, power means connected to said table for moving the same from a lowered position, whereby the track section is in registry with said cradle track, to a raised position, whereby the track section is in registry with said upper track, means adapted to move a loaded carrier from said track section during the raised position of said table to said upper track, and means on said table adapted to tilt said cradle track to a raised position whereby a carrier on said cradle track is discharged to said track section.

18. A mold-handling arrangement comprising: a mold-making station, a molding machine at said station, a mold-loading station adjacent said mold-making station, a conveyor adjacent said loading station, said conveyor including upper and lower tracks adapted to movably support mold carriers, a movable cradle including a cradle track positioned adjacent an open end of said lower track, said cradle during one position being adapted to receive an empty mold carrier from said lower track, and during a second position being adapted to discharge said carrier, an elevating mechanism positioned in said loading station, said elevating mechanism comprising a table, power means connected to said table to move the same from a lowered position, wherein an empty carrier on said cradle track is discharged to said table, to a raised position in registry with said upper track, a mold handler positioned between said molding machine and said elevating mechanism, said handler comprising a support, an inclined track on said support, a wheeled dolly on said inclined track, actuating means connected to said support and said dolly for moving said dolly and a mold carried thereon from a position above said table to a position substantially level with said table in its raised position, and ejection means on said elevating mechanism for moving a loaded carrier from said table during its raised position to said upper track.

19. A mold-handling arrangement comprising: a mold-making station, a molding machine at said station, a mold-loading station adjacent said mold-making station, a conveyor adjacent said loading station, said conveyor including upper and lower tracks adapted to movably support mold carriers, a movable cradle including a cradle track position adjacent an open end of said lower track, said cradle during one position being adapted to receive an empty mold carrier from said lower track, and during a second position being adapted to discharge said carrier, an elevating mechanism positioned in said loading station, said elevating mechanism comprising a table, power means connected to said table to move the same from a lowered position, wherein an empty carrier on said cradle track is discharged to said table, to a raised position in registry with said upper track, a mold handler positioned between said molding machine and said elevating mechanism, said handler comprising a support, an inclined track on said support, a platform slideable on said inclined track, actuating means connected to said support and said platform for moving said platform and a mold carried thereon from a position above said table to a position substantially level with said table in its raised position, whereby a mold may be transferred to said table in its raised position.

20. A mold-handling arrangement comprising: a mold-making station, a molding machine at said station, a mold-loading station adjacent said mold-making station, a conveyor adjacent said loading station, said conveyor including upper and lower tracks adapted to movably support mold carriers, a movable cradle including a cradle track positioned adjacent an open end of said lower track, said cradle during one position being adapted to receive an empty mold carrier from said lower track, and during a second position being adapted to discharge said carrier, an elevating mechanism positioned in said loading station, said elevating mechanism comprising a table, power means connected to said table to move the same from a lowered position, wherein an empty carrier on said cradle track is discharged to said table, to a raised position in registry with said upper track, a mold handler positioned between said molding machine and said elevating mechanism, said handler comprising a support, a movable platform on said support, actuating means connected to said platform for moving said platform and a mold carried thereon from a position above said table and adjacent said molding machine to a position substantially level with and adjacent to said table in its raised position, and ejection means on said elevating mechanism for moving a loaded carrier from said table during its raised position to said upper track.

21. A mold-handling mechanism comprising: upper and lower conveyor tracks adapted to movably support a plurality of mold carriers, an elevating mechanism positioned adjacent open adjacent ends of said tracks comprising a horizontal table having a track section, said track section being adapted to register with said lower track during a lowered position to receive an empty carrier therefrom and with said upper track in an upper position to discharge a loaded carrier thereto, actuating means for raising and lowering said table, a stop member on said table, said stop comprising an arm pivotally mounted on said table, said arm normally engaging a carrier on said table to retain the same on said track section, said arm during a lowered position of said carrier being moved to an out-of-the-way position to permit movement of a carrier from said lower track into said track section, said arm being movable during upward movement of the table to engage said carrier, an ejection mechanism on said elevating mechanism, said ejection mechanism including a fluid-extensible device, means supporting said extensible device above said table, said device including a reciprocable ram, hook means on said ram, said ram and hook means being movable toward said table to engage a loaded carrier thereon and movable to pull the carrier from said table to said upper conveyor track, and means on said ram engageable with said arm for moving the same to an out-of-the-way position during reciprocation of said ram.

22. A mold-handling mechanism comprising: upper and lower conveyor tracks adapted to movably support a plurality of mold carriers, an elevating mechanism positioned adjacent open adjacent ends of said tracks comprising a horizontal table having a track section, said track section being adapted to register with said lower track during a lowered position to receive an empty carrier therefrom and with said upper track in an upper position to discharge a loaded carrier thereto, actuating means for raising and lowering said table, a stop member on said table, said stop comprising an arm pivotally mounted on said table, said arm normally engaging a carrier on said table to retain the same on said track section, said arm during a lowered position of said carrier being moved to an out-of-the-way position to permit movement of a carrier from said lower track into said track section, said arm being movable during upward movement of the table to engage said carrier, an ejection mechanism on said elevating mechanism, said ejection mechanism including a reciprocable ram positioned above said table, engaging means on said ram, said ram and engaging means being movable toward said table to engage a loaded carrier thereon and movable to pull the carrier from said table to said upper conveyor track, and means on said ram engageable with said arm for moving the same to an out-of-the-way position during reciprocation of said ram.

23. A mold-handling mechanism comprising: upper and lower conveyor tracks adapted to movably support a plurality of mold carriers, an elevating mechanism positioned adjacent open adjacent ends of said tracks comprising a horizontal table having a track section, said track section being adapted to register with said lower track during a lowered position to receive an empty carrier therefrom and with said upper track in an upper position to discharge a loaded carrier thereto, actuating means for raising and lowering said table, a stop member on said table, said stop being movably positioned and normally engaging a carrier on said table to retain the same on said track section, said stop during a lowered position of said carrier being moved to an out-of-the-way position to permit movement of a carrier from said lower track into said track section, said stop being movable during upward movement of the table to engage said carrier, an ejection mechanism on said elevating mechanism, said ejection mechanism including a reciprocable ram positioned above said table, engaging means on said ram, said ram and engaging means being movable toward said table to engage a loaded carrier thereon and movable to pull the carrier from said table to said upper conveyor track, and means actuated by said ram engageable with said stop for moving the same to an out-of-the-way position during reciprocation of said ram.

24. A wheeled carrier-handling mechanism comprising: an upper track and a lower track disposed beneath said upper track, an elevating mechanism comprising a table having a track section, said table and track section being movable in registry with said lower track to receive an empty wheeled carrier from said lower track, said table and track section being movable into registry with said upper track, a carrier-retaining mechanism on said table, said mechanism comprising a first stop adapted to be engaged by said carrier for limiting movement of the same in one direction, a second stop including an arm pivotally mounted on said table, said arm having a counterweight for normally maintaining said arm in a horizontal position, a wheel chock on said arm, said chock in the normal position being disposed against one of the wheels of the carrier for retaining the same against movement in a second direction, an ejector mechanism adjacent said table, said ejector mechanism being movable to engage a carrier and to retract the same from said track section, means on said ejector mechanism for engaging said arm during movement of said ejector mechanism to move said arm and said chock out of engagement with said carrier, and means on said arm for moving the same to an out-of-the-way position when said track section is in registry with said lower track.

25. A wheeled carrier-handling mechanism comprising: an upper track and a lower track disposed beneath said upper track, an elevating mechanism comprsing a table having a track section, said table and track section being movable in registry with said lower track to receive an empty wheeled carrier from said lower track, said table and track section being movable into registry with said upper track, a carrier-retaining mechanism on said table, said mechanism comprising a first stop adapted to be engaged by said carrier for limiting movement of the same in one direction, a second stop including an arm movably mounted on said table, said arm having means for normally maintaining said arm in a locking position, a wheel chock on said arm, said chock in the locking position being disposed against one of the wheels of the carrier for retaining the same against movement in a second direction, an ejector mechanism adjacent said table, said ejector mechanism being movable to engage a carrier and to retract the same from said track section, means on said ejector mechanism for engaging said arm during movement of said ejector mechanism to move said arm and said chock out of locking position, and means on said arm for moving the same from the locking position when said track section is in registry with said lower track.

26. A wheeled carrier-handling mechanism comprising: an upper track and a lower track disposed beneath said upper track, an elevating mechanism comprising a table having a track section, said table and track section being movable in registry with said lower track to receive an empty wheeled carrier from said lower track, said table and track section being movable into registry with said upper track, a carrier-retaining mechanism on said table, said mechanism comprising a first stop adapted to be engaged by said carrier for limiting movement of the same in one direction, a second stop including an arm movably mounted on said table, said arm having means for normally maintaining said arm in a locking position, a wheel chock on said arm, said chock in the locking position being disposed against one of the wheels of the carrier for retaining the same against movement in a second direction, an ejector mechanism adjacent said table, said ejector mechanism being movable to engage a carrier and to retract the same from said track section, and means on said ejector mechanism for engaging said arm during movement of said ejector mechanism to move said arm and said chock out of locking position.

27. A mold-handling mechanism comprising: a loading station, a conveyor adjacent said loading station, said conveyor including an upper track and a lower track for respectively moving an empty mold carrier from and to said molding station, elevating means at said loading station, said means including a table having tracks thereon, said table being movable from a lowered to an upper position, a cradle positioned between said conveyor and said elevating means, said cradle including a cradle track, means pivotally mounting said cradle whereby said cradle track may be moved to a position relative to said lower track to receive said empty mold carrier from said lower track, and means connected to said table for moving said table to said lowered position whereby said cradle is pivoted and said cradle track is placed into alignment with said table track and said empty mold carrier is discharged to said table, said table being movable to the upper position whereby a loaded mold carrier may be discharged to said upper track.

28. A mold-handling mechanism comprising: a loading station, a conveyor adjacent said loading station, said conveyor including an upper track and a lower track for respectively moving an empty mold carrier from and to said molding station, elevating means at said loading station, said means including a table having tracks thereon, said table being movable from a lowered to an upper position, a cradle positioned between said conveyor and said elevating means, said cradle including a cradle track, means pivotally mounting said cradle whereby said cradle track may be moved to a position relative to said lower track to receive said empty mold carrier from said lower track, and means connected to said table for moving said table to said lowered position to engage and tilt said cradle whereby said cradle track is placed into alignment with said table track and said empty mold carrier is discharged to said table.

29. A mold-handling mechanism comprising: a loading station, first and second substantially parallel conveyors adjacent said loading station, each conveyor including an upper track and a lower track for respectively moving mold carriers to and from said loading station, a transversely extending track positioned adjacent open ends of said upper and lower tracks, a transfer car movable on said transverse track, said car having upper and lower stub tracks movable into registry with said upper and lower tracks, elevating means at said loading station, said means including a table alternately movable to a raised and to a lowered position, a cradle positioned between said conveyor and said elevating means, said cradle including a cradle track having one end adapted to be in registry with the lower stub track to receive an empty carrier therefrom, means on said table adapted to move said table to a lowered position to register with said cradle track whereupon the empty mold carrier is discharged to said table track, means adapted to move a loaded mold carrier from said table track to said upper stub track during the raised position of said table, and means for discharging said loaded carrier to said upper track of said conveyors.

30. A mold-handling mechanism comprising: a loading station, first and second substantially parallel conveyors adjacent said loading station, each conveyor including an upper track and a lower track for respectively moving mold carriers to and from said loading station, a transversely extending track positioned adjacent open ends of said upper and lower tracks, a transfer car movable on said transverse track, said car having upper and lower stub tracks movable into registry with said upper and lower tracks, elevating means at said loading station, said means including a table alternately movable to a raised and to a lowered position, a cradle positioned between said conveyors and said elevating means, said cradle including a cradle track having one end adapted to be in registry with the lower stub track to receive an empty carrier therefrom, means on said table adapted to move said table to a lowered position to engage said cradle whereupon the empty mold carrier is discharged to said table track, means adapted to move said table and empty mold carrier to the raised position, and means for discharging said loaded carrier to said upper tracks of said conveyors.

31. A wheeled carrier-handling mechanism comprising: an upper track and a lower track disposed beneath said upper track, an elevating mechanism comprising a table having a track section, said table and track section being movable in registry with said lower track to receive an empty wheeled carrier from said lower track, said table and track section being movable into registry with said upper track, a carrier-retaining mechanism on said table, said mechanism comprising a first stop adapted to be engaged by said carrier for limiting movement of the same in one direction, a movable stop normally in a locking position being disposed against one of the wheels of the carrier for retaining the same against movement in a second direction, an ejector mechanism adjacent said table, said ejector mechanism being movable to engage a carrier and to retract the same from said track section, and means on said ejector mechanism for engaging said movable stop during movement of said ejector mechanism to move said movable stop out of locking position.

References Cited in the file of this patent

UNITED STATES PATENTS

| | | |
|---|---|---|
| 1,577,589 | Rapp | Mar. 23, 1926 |
| 1,735,777 | Merritt | Nov. 12, 1929 |
| 1,819,017 | Drake | Aug. 18, 1931 |
| 1,857,840 | Drake | May 10, 1932 |
| 2,718,679 | Lasater et al. | Sept. 27, 1955 |